April 23, 1957        M. A. ALLEN        2,789,457
UNIVERSALLY FLOATING NUT
Filed April 10, 1953
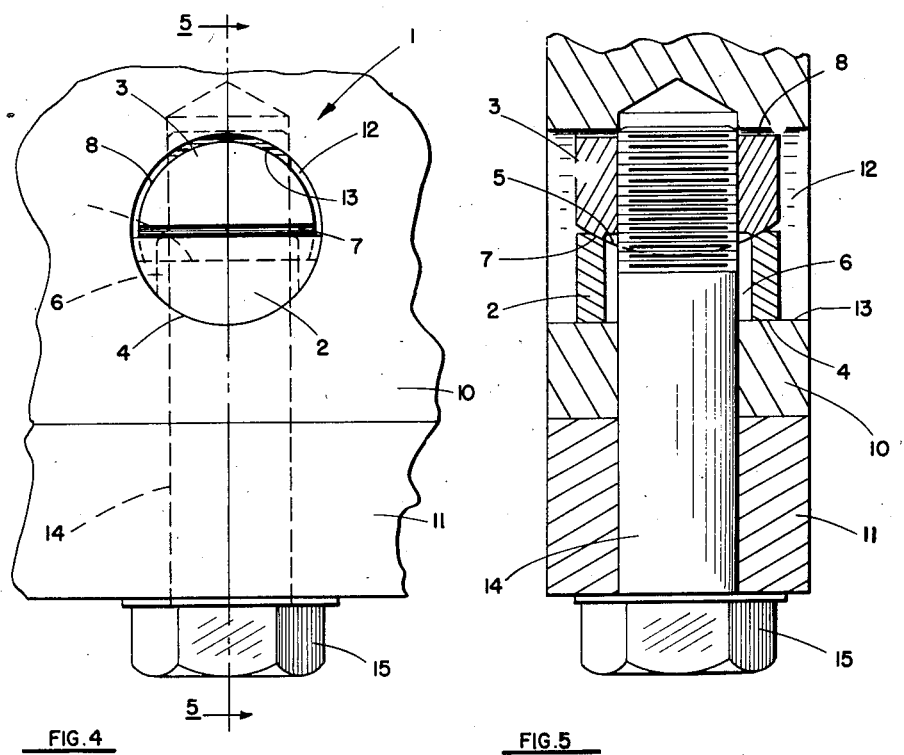
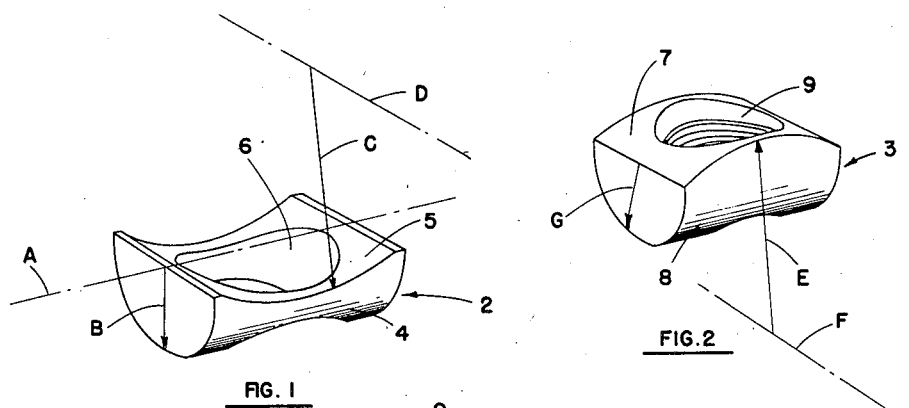
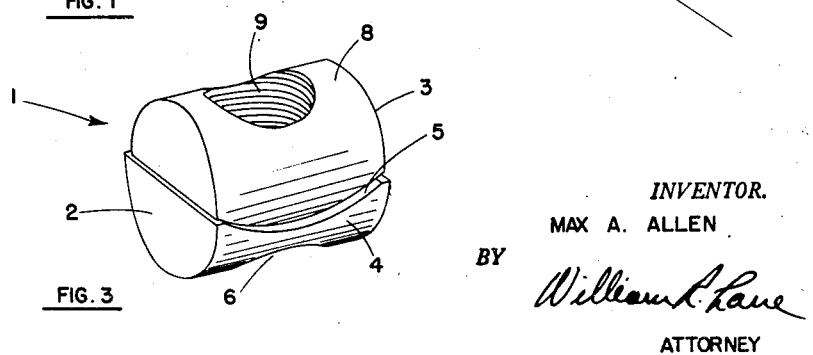
INVENTOR.
MAX A. ALLEN
BY William R. Lane
ATTORNEY United States Patent Office 2,789,457
Patented Apr. 23, 1957

2,789,457

UNIVERSALLY FLOATING NUT

Max A. Allen, Culver City, Calif., assignor to North American Aviation, Inc.

Application April 10, 1953, Serial No. 347,885

3 Claims. (Cl. 85—32)

This invention pertains to a floating nut and more particularly to a floating nut adapted to permit lineal and angular movement in any direction.

An object of this invention is to provide a floating nut which will permit angular and lineal adjustment.

Another object of this invention is to provide a floating nut which will permit considerable movement and is adapted for fastening together badly misaligned parts.

Another object of this invention is to provide a floating nut which is light in weight and strong.

Yet another object of this invention is to provide a floating nut which can be easily and economically manufactured.

A still further object of this invention is to provide a floating nut of the barrel type which fits within a cylindrical aperture and permits universal movement of a bolt shank.

These and other objects will become apparent from the following detailed description taken in connection with the accompanying drawing in which, Fig. 1 is a perspective view of the spacer portion of the nut of this invention, Fig. 2 is a perspective view of the threaded element of this invention, shown in an inverted position, Fig. 3 is a perspective view of the two elements of the nut in an assembled position, Fig. 4 is an end elevational view of the floating nut of this invention in use with a bolt for holding together two parts, and Fig. 5 is a sectional view taken along line 5—5 of Fig. 4.

This invention provides a floating nut of the barrel type which permits universal movement of the bolt which is attached thereto. Nut 1 is comprised of two pieces, including bottom saddle or spacer element 2, as shown in Fig. 1, and a top threaded holding element 3, illustrated in Fig. 2. As illustrated in the drawing, bottom surface 4 of spacer member 2 is curved in one direction. Surface 4 is semicylindrical, being defined by a portion of a cylinder. The axis A of the cylinder defining that surface extends lingitudinally of the member and the radius indicated at B is the radius of such a cylinder. Element 2 includes an upper surface 5 which is also semicylindrical, being curved in one direction. Normally this surface has a larger radius of curvature C than that used for bottom surface 4. The axis D of the cylinder, a portion of which defines upper surface 5, is at right angles to axis A of the cylinder defining lower surface 4, thus extending transversely of element 2. This element also includes an enlarged central opening 6.

Upper member 3 as illustrated in Fig. 2 has a curved lower surface 7 which is complementary to upper surface 5 of element 2, having a radius E equal to radius C. (Element 3 is shown inverted in Fig. 2 for purposes of clarity so that surface 7 appears on top in this figure.) Surface 7 is likewise defined by a portion of a cylinder with the axis F thereof transverse of the member. Upper surface 8 of element 3 may be curved as a portion of a cylinder having radius G, less than radius B, which will allow the assembled nut to properly fit within a restricted aperture in a workpiece as more fully explained below. An aperture 9 extends through element 3, this aperture being of lesser diameter than aperture 6 in element 2 and threaded for the reception of a threaded bolt shank.

Fig. 3 illustrates the two halves of the floating nut in an assembled position with surface 7 of element 3 engaging surface 5 of element 2. When so assembled aperture 9 is disposed above aperture 6 of element 2 and axes of curvature D and F coincide. The two elements are free to move linearly relative to each other transversely of the two members in the direction of the axes of surfaces 7 and 5. These elements also provide for relative angular movement about the axes of surfaces 5 and 7 which is thereby in a plane perpendicular to the plane of the path of the linear movement of the elements.

As shown in Figs. 4 and 5 the nut is utilized to hold together two parts 10 and 11. Part 10 includes a cylindrical aperture 12 therein having a wall 13 which is defined by a curve complementary to lower surface 4 of element 2. When the assembled nut is placed within this opening surface 8 of element 3, having a smaller radius, clears the surface of the opening and surface 4 engages the bottom portion thereof. Member 2 is thereby movable linearly in the aperture in the direction of axis A, and movable angularly about the axis, without disengagement from wall 13. The nut so positioned within cylindrical aperture 12 is adapted to receive the shank 14 of a bolt extending through these members and having a head 15 in engagement with the bottom surface of part 11. For such a joint the apertures in parts 10 and 11 for shank 14 are preferably at 90° to aperture 12. The threaded end of shank 14 is received by threaded aperture 9 of element 3 in the manner of an ordinary bolt and nut combination. Note that shank 14 is of lesser diameter than aperture 6 of element 2.

For ease in assembly of nut 1, either of parts 2 and 3 thereof may be magnetized. This will retain the two elements together which will facilitate handling prior to fastening of the parts together by the bolt.

In some cases, the bolt receiving apertures in parts 10 and 11 will be inclined at an angle other than 90° to nut receiving aperture 12. This may often occur in production from an inadvertent tilting of the drill when the apertures are made. In order for the joint to provide its maximum strength, the nut must firmly engage the workpiece despite angularity of the bolt shank relative thereto. Nut 1 of this invention is designed to retain proper engagement with the workpiece despite inclination of the bolt shank. For angular displacement of the bolt shank in one direction, surfaces 7 and 5 may be slid relative to each other about their axes of curvature in a plane perpendicular thereto so that the shank of bolt may be tilted to compensate for angularity of the bolt shank openings. Large aperture 6 in spacer 2 allows this angular movement while the bolt shank is held in smaller aperture 9. Surfaces 7 and 5, by having identical and constant curvatures, will be firmly in engagement despite the angular movement of the elements of the nut. Angular movement in a direction at 90° to that provided by surfaces 7 and 5 is obtained by rotating surface 4 of spacer member 2 in lower part of complementary cylindrical aperture 12. When this is done members 2 and 3 will be retained in firm engagement, as will surface 4 with wall 13 of aperture 12, so as to form a positive means of absorbing the force in the bolt. These provisions for angular movement in the two planes at 90° to each other will allow angular movement in any direction by a combined movement in the two planes. The floating nut in this invention therefore provides a universally floating action for any angular movement.

In some installations parts 10 and 11 will not be well matched or the bolt openings therein may be oversize or not properly aligned so as to require lineal movement of the bolt shank. If such condition should occur the nut of this invention is adapted to accommodate any linear movement necessary while still maintaining proper contact with wall 13 of aperture 12. When such adjustment is required, lineal movement of part 3 relative to part 2 along surfaces 7 and 5 in the direction of their axes of curvature will allow the bolt shank to be moved lineally in one direction in accommodating misalignment. Lineal movement in a direction at right angles to these axes is obtained by sliding surface 4 of element 2 along wall 13 in the direction of the axes of curvature of surface 4 and the aperture. A combination of the two movements will provide linear adjustment in any other direction as required. Aperture 6 by being larger than aperture 9 and thus larger than the bolt shank will permit any relative movement between the two elements of the nut with the bolt shank in place.

The nut of this invention, is therefore, a truly universally floating nut which will allow angular movement of the bolt shank in any direction and lineal movement of the bolt shank in any direction. No loss of strength is entailed in providing this movement because the elements involved are always in firm engagement. This allows badly mismated parts to be nevertheless assembled into a firmly retained unit thereby salvaging parts which in many cases would be discarded because of improper matching of bolt holes. It also permits the use of increased tolerances in the manufacture of the parts, thereby reducing costs.

It should be clearly understood that the foregoing detail description is given by way of example only, the spirit and scope of this invention being limited only by the appended claims.

I claim:

1. A universally floating nut comprising a base member the bottom surface of which has a convex curvature defined by a portion of a cylinder, said surface being adapted to slidingly engage a complementary portion of a workpiece so that said base member has freedom for linear movement relative to said workpiece in the direction of the axis of the curvature of said convex surface, and freedom for angular movement relative to said workpiece about said axis of curvature, the top surface of said base member having a concave curvature defined by a portion of a cylinder having an axis at right angles to said first mentioned axis of curvature; and a holding member movable relative to said base member, said holding member having a convex bottom surface complementary to and engaging said concave surface, said concave surface of said base member being unobstructed with respect to said holding member for permitting linear movement of said holding member along said concave surface in the direction of the axis thereof, and angular movement along said concave surface about the axis thereof, said holding member having a threaded aperture therethrough for engaging a bolt, said base member having an aperture therethrough of greater diameter than said threaded aperture for freely passing such a bolt therethrough and permitting relative movement between said base member and said holding member.

2. A universally floating nut comprising a base member, said base member having a convex surface defined by a portion of a cylinder, said surface being adapted to engage a complementary portion of a workpiece so that said base member has freedom for linear movement relative to said workpiece in the direction of the axis of curvature of said convex surface, and freedom for angular movement along said surface about said axis of curvature, the opposite side of said base member having a concave surface defined by a portion of a cylinder having an axis at right angles to said first mentioned axis of curvature; and a holding member, said holding member having a surface complementary to and slidingly engaging said concave surface of said base member, said concave surface being unobstructed with respect to said holding member so that said holding member is angularly movable along said concave surface about the axis thereof and linearly movable along said concave surface in the direction of the axis of said concave surface, the opposite side of said holding member having a convex contour defined by a portion of a cylinder having an axis at right angles to the axis of said first mentioned surface of said holding member, said convex surface of said holding member having a smaller radius than the radius of said convex surface of said base member, said holding member having a threaded aperture therethrough, said base member having an aperture of greater lateral dimension than the lateral dimension of said aperture in said holding member for freely passing a bolt shank received in said threaded aperture.

3. In combination with a member having a cylindrical nut-receiving aperture therein and a bolt-receiving aperture substantially normal to and intersecting the axis thereof, a universally floating nut in said nut-receiving aperture comprising a base member having a convex surface complementarily engaging said nut-receiving aperture with freedom for linear movement relative thereto in the direction of the axis of said nut-receiving aperture and angular movement relative thereto about the axis of said nut-receiving aperture, the opposite side of said base member having an open ended concave surface defined by a portion of a cylinder having its axis at right angles to the axis of said convex surface of said base member, said base member having an aperture therethrough interconnecting said surfaces thereof, said aperture being larger than said bolt-receiving aperture and substantially in registry therewith; and a holding member having a convex surface complementarily engaging said concave surface of said base member, said holding member being spaced from the surface of said nut-receiving aperture and dimensioned with respect to said base member such that said holding member is linearly movable in the direction of the axis of said concave surface and angularly movable about said axis of said concave surface, said holding member having a threaded aperture therethrough normal to the axis of the convex surface thereof and smaller than said aperture through said base member.

References Cited in the file of this patent

UNITED STATES PATENTS

| | | |
|---|---|---|
| 167,118 | Pritchett | Aug. 24, 1875 |
| 841,742 | Van Horn et al. | Jan. 22, 1907 |
| 1,077,051 | Dodds | Oct. 28, 1913 |
| 1,345,358 | Fuller | July 6, 1920 |
| 1,412,502 | Andrioli | Apr. 11, 1922 |
| 1,548,382 | Paul | Aug. 4, 1925 |
| 1,581,802 | Holmes et al. | Apr. 20, 1926 |
| 2,401,208 | Walensky | May 28, 1936 |
| 2,623,399 | Barrett | Dec. 30, 1952 |